(12) United States Patent
Joisson et al.

(10) Patent No.: US 7,379,512 B2
(45) Date of Patent: May 27, 2008

(54) FREQUENCY-MODULATED SIGNAL RECEIVER WITH DIGITAL DEMODULATOR

(75) Inventors: Marc Joisson, Grenoble (FR); Luc Garcia, Saint Paul De Varces (FR); Marc Gens, Saint-Martin-D'Uriage (FR)

(73) Assignee: STMicroelectronics S.A., Montrouge (FR)

( * ) Notice: Subject to any disclaimer, the term of this patent is extended or adjusted under 35 U.S.C. 154(b) by 754 days.

(21) Appl. No.: 10/103,575

(22) Filed: Mar. 21, 2002

(65) Prior Publication Data

US 2002/0168028 A1  Nov. 14, 2002

(30) Foreign Application Priority Data

Mar. 21, 2001  (FR)  .................................. 01 03788

(51) Int. Cl.
*H03D 3/24* (2006.01)
(52) U.S. Cl. ...................................................... 375/327
(58) Field of Classification Search ................ 375/324, 375/327, 334, 355, 373, 374, 375, 376; 331/37, 331/40, 41, 42; 342/103; 455/260
See application file for complete search history.

(56) References Cited

U.S. PATENT DOCUMENTS

| 4,813,058 | A | | 3/1989 | Takase |
| 5,375,146 | A | | 12/1994 | Chalmers |
| 5,402,446 | A | | 3/1995 | Minami |
| 5,430,890 | A | * | 7/1995 | Vogt et al. ................ 455/180.3 |
| 5,444,736 | A | * | 8/1995 | Kawashima et al. ......... 375/219 |
| 5,914,592 | A | * | 6/1999 | Saito ....................... 324/121 R |
| 6,067,319 | A | | 5/2000 | Copeland |
| 6,314,145 | B1 | * | 11/2001 | van Driest ................... 375/326 |
| 6,404,293 | B1 | * | 6/2002 | Darabi et al. .................. 331/37 |
| 6,724,836 | B1 | * | 4/2004 | Graf et al. .................... 375/334 |
| 6,738,601 | B1 | * | 5/2004 | Rofougaran et al. ........ 455/66.1 |

OTHER PUBLICATIONS

Preliminary Search Report for French Patent Application No. 0103788 dated Nov. 21, 2001.

* cited by examiner

*Primary Examiner*—Sam K. Ahn
(74) *Attorney, Agent, or Firm*—Lisa K. Jorgenson; Stephen Bongini; Fleit Kain Gibbons Gutman Bongini & Bianco P.L.

(57) ABSTRACT

A receiver of a frequency-modulated signal is provided. The receiver includes a frequency-transposition unit for lowering the frequency of the frequency-modulated signal, and a digital demodulator for regenerating a digital signal from the frequency-transposed signal. The frequency-transposition unit includes a local oscillator for generating a local oscillator signal used in lowering the frequency of the frequency-modulated signal. The frequency-transposed signal is sampled in the digital demodulator at the rate of a sampling signal, and the sampling signal is generated by the local oscillator of the frequency-transposition unit. In a preferred embodiment, the local oscillator includes at least one frequency-divider circuit that delivers the sampling signal. Also provided is a method for regenerating a digital signal from a frequency-modulated signal.

20 Claims, 2 Drawing Sheets

FREQUENCY-MODULATED SIGNAL RECEIVER WITH DIGITAL DEMODULATOR

CROSS-REFERENCE TO RELATED APPLICATIONS

This application is based upon and claims priority from prior French Patent Application No. 01-03788, filed Mar. 21, 2001, the entire disclosure of which is herein incorporated by reference.

BACKGROUND OF THE INVENTION

1. Field of the Invention

The present invention relates to radio communication systems, and more specifically to a frequency-modulated signal receiver with a digital demodulator.

2. Description of Related Art

The technique of frequency modulation or frequency shift keying is commonly used to transmit a digital signal from a transmitter to a receiver by associating a particular modulation frequency with each digital value of the digital signal. In the case of a binary signal, a frequency f1 is assigned to the value 0 and a frequency f2 to the value 1. The transmitter then has a modulator which, for each digital value, sends the modulation frequency associated with the value and the receiver has a digital demodulator whose task is to restore the binary values of the digital signal by discriminating between the modulation frequencies of the modulated signal that is received.

For example, the demodulation of such signals can consist of measuring the period of the received signal by sampling it at a very high frequency, and comparing the value of the period that is measured with period values corresponding to the different modulation frequencies. The precision of the measurement requires that the frequency of the sampling signal should be far higher than the modulation frequencies of the received signals (i.e., than the frequencies f1 and f2 in the case of a binary signal). The sampling frequency must be made greater as the frequencies f1 and f2 are made higher. The sampling frequency must also be made greater as the frequencies f1 and f2 are made closer to each other so that the demodulator can properly discriminate between them. Thus, in order that the necessary sampling frequency may not be excessively high, the frequency of the received signal is generally lowered to an intermediate frequency of lower value by a frequency-transposition unit placed upline from the digital demodulator in the receiver.

To generate the sampling signal, the receiver usually has a clock circuit assigned exclusively to this use. The presence of such a clock circuit has the following drawbacks: it takes up considerable surface area on the silicon, consumes current, and may also create parasitic noise for the other elements of the receiver.

SUMMARY OF THE INVENTION

In view of these drawbacks, it is an object of the present invention to overcome the above-mentioned drawbacks and to provide a receiver of frequency-modulated signals (or frequency-shift-keyed signals) that is simple in design and limited in size and cost. According to preferred embodiments of the invention, a sampling signal is produced by the local oscillator of the frequency transposition stage of the receiver. This local oscillator is usually responsible for generating a signal at a relatively high frequency (e.g., in the range of several GHz) to transpose the received signal into a signal at a lower intermediate frequency. This local oscillator is therefore capable of producing a sampling signal at a frequency that is high enough to measure the period of the received signal that is transposed in frequency. Thus, the receiver of the present invention does not require the presence of a dedicated clock circuit to generate the sampling signal.

Another object of the present invention is to provide such a frequency-modulated signal receiver in integrated circuit form.

One embodiment of the present invention provides a receiver of a frequency-modulated signal is provided. The receiver includes a frequency-transposition unit for lowering the frequency of the frequency-modulated signal, and a digital demodulator for regenerating a digital signal from the frequency-transposed signal. The frequency-transposition unit includes a local oscillator for generating a local oscillator signal used in lowering the frequency of the frequency-modulated signal. The frequency-transposed signal is sampled in the digital demodulator at the rate of a sampling signal, and the sampling signal is generated by the local oscillator of the frequency-transposition unit. In a preferred embodiment, the local oscillator includes a reference oscillator, and a phase-locked loop having a feedback portion that includes first and second cascade-connected frequency-divider circuits, with the sampling signal being delivered by the first frequency-divider circuit.

Another embodiment of the present invention provides a method for regenerating a digital signal from a frequency-modulated signal that represents the digital signal. According to the method, a local oscillator signal generated by a frequency-transposition unit is used to lower the frequency of the frequency-modulated signal, and a sampling signal is generated from the local oscillator signal generated by the frequency-transposition unit. The frequency-transposed signal is sampled at the rate of the sampling signal, and the digital signal is regenerated from the frequency-transposed signal. In one preferred method, the local oscillator signal is frequency-divided to produce the sampling signal.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

According to preferred embodiments of the invention, the sampling signal given to a digital demodulator is generated by the local oscillator of a frequency-transposition unit of the receiver. Indeed, this local oscillator is commonly used to generate a signal with a frequency of some GHz to lower the frequency of the signal received by the receiver to an intermediate frequency of some MHz. This local oscillator is therefore capable of generating a sampling signal with a frequency that is high enough to sample the frequency-modulated signal that has been first transposed to the intermediate frequency.

Figure 1:
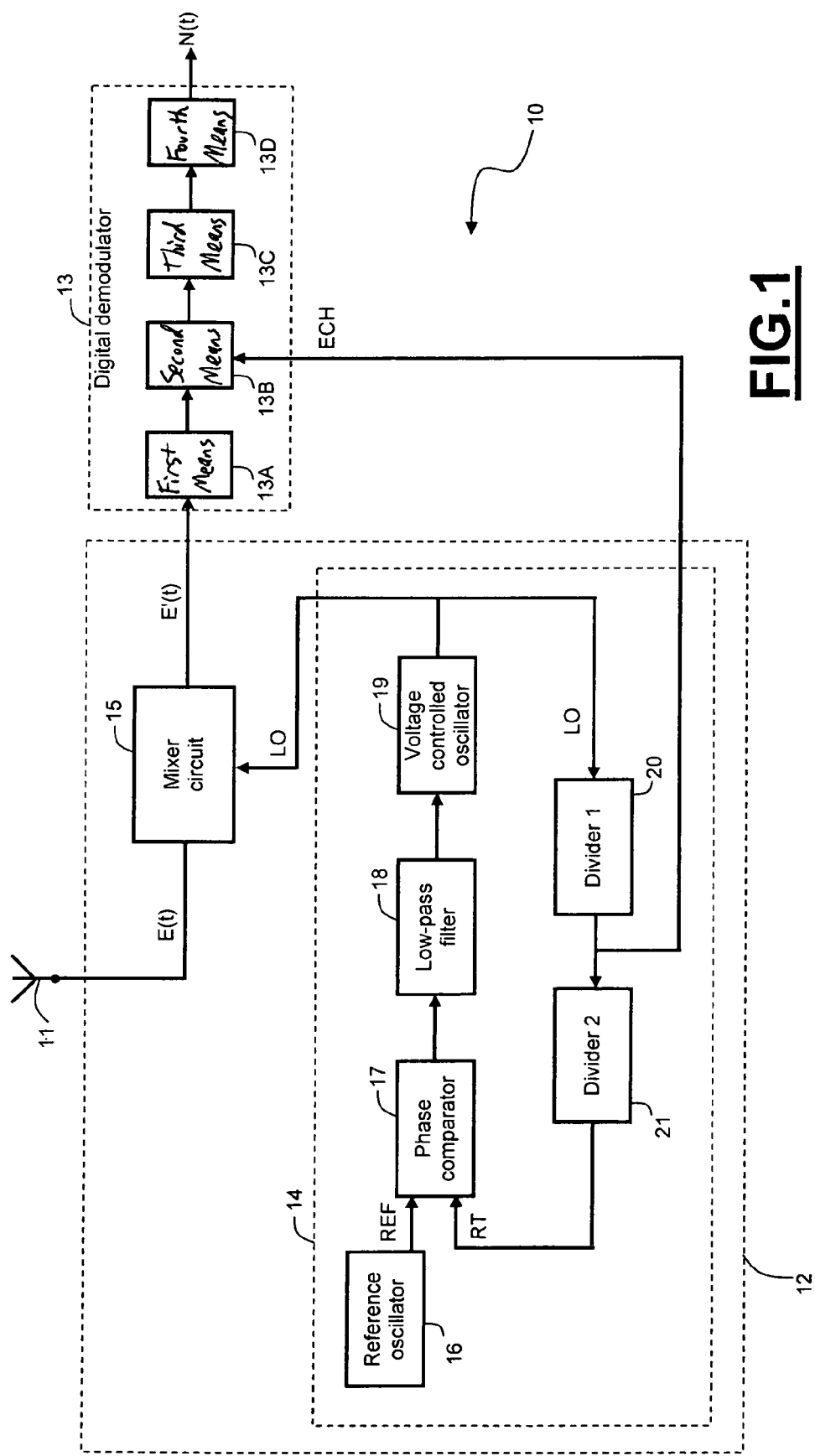
FIG. 1 is a block diagram of a receiver according to a preferred embodiment of the present invention.

FIG. 1 is a drawing of a receiver according to a preferred embodiment of the present invention. The receiver 10 comprises an antenna 11 to pick up a frequency-shift-keyed analog signal E(t), a first frequency-transposition unit 12 to lower the frequency of the signal E(t) and deliver a signal E'(t), and a digital demodulator 13 to demodulate the signal E'(t) and deliver a digital signal N(t).

To lower the frequency of the signal E(t), the unit 12 comprises a local oscillator 14 that generates a local oscillator signal LO with a frequency $f_{LO}$ and a mixer circuit 15 that multiplies the signal E(t) with the signal LO. In this unit, the frequency of the signal E(t) is lowered by the value $f_{LO}$. According to preferred embodiments of the present invention, this local oscillator is also designed to generate a sampling signal ECH for the digital demodulator.

In the embodiment shown in FIG. 1, the local oscillator 14 comprises a reference oscillator 16 delivering a reference signal REF and a phase-locked loop. The phase-locked loop has a two-input phase comparator 17 receiving the reference signal REF at a first input and a loop signal RT at a second input. The signal at the output of the phase comparator 17 is filtered by a low-pass filter 18 and then processed by a voltage-controlled oscillator 19. The signal delivered by the voltage-controlled oscillator 19 is frequency-divided by two cascade-connected frequency dividers 20 and 21. The signal delivered by the frequency divider 21 corresponds to the loop signal RT and is therefore given to the second input of the phase comparator 17. The signal LO applied to the second input of the mixer circuit 15 is the signal delivered by the voltage-controlled oscillator 19. The working of this phase-locked loop is well known to one of ordinary skill in the art.

The sampling signal ECH is a signal delivered by the frequency divider 20. The frequency of the signal is lower than that of the signal LO but remains high enough for sampling the signal E'(t). The frequency of the sampling signal may be furthermore easily adjusted by modifying the ratio of division of the frequency dividers 20 and 21.

The sampling signal is used by the digital demodulator 13 to sample the signal E'(t). There are many possible architectures of digital demodulators. In the example of FIG. 1, the demodulator has first means 13A to convert the signal E'(t) into a logic signal, second means 13B to sample and detect the transitions of the logic signal (namely the leading edges or the trailing edges of this signal), third means 13C to measure the time that has elapsed between two consecutive leading edges or trailing edges of the logic signal, and fourth means 13B to compare the time measured with periodic values corresponding to particular digital values and thus reconstitute the digital signal before modulation N(t).

Figure 2:
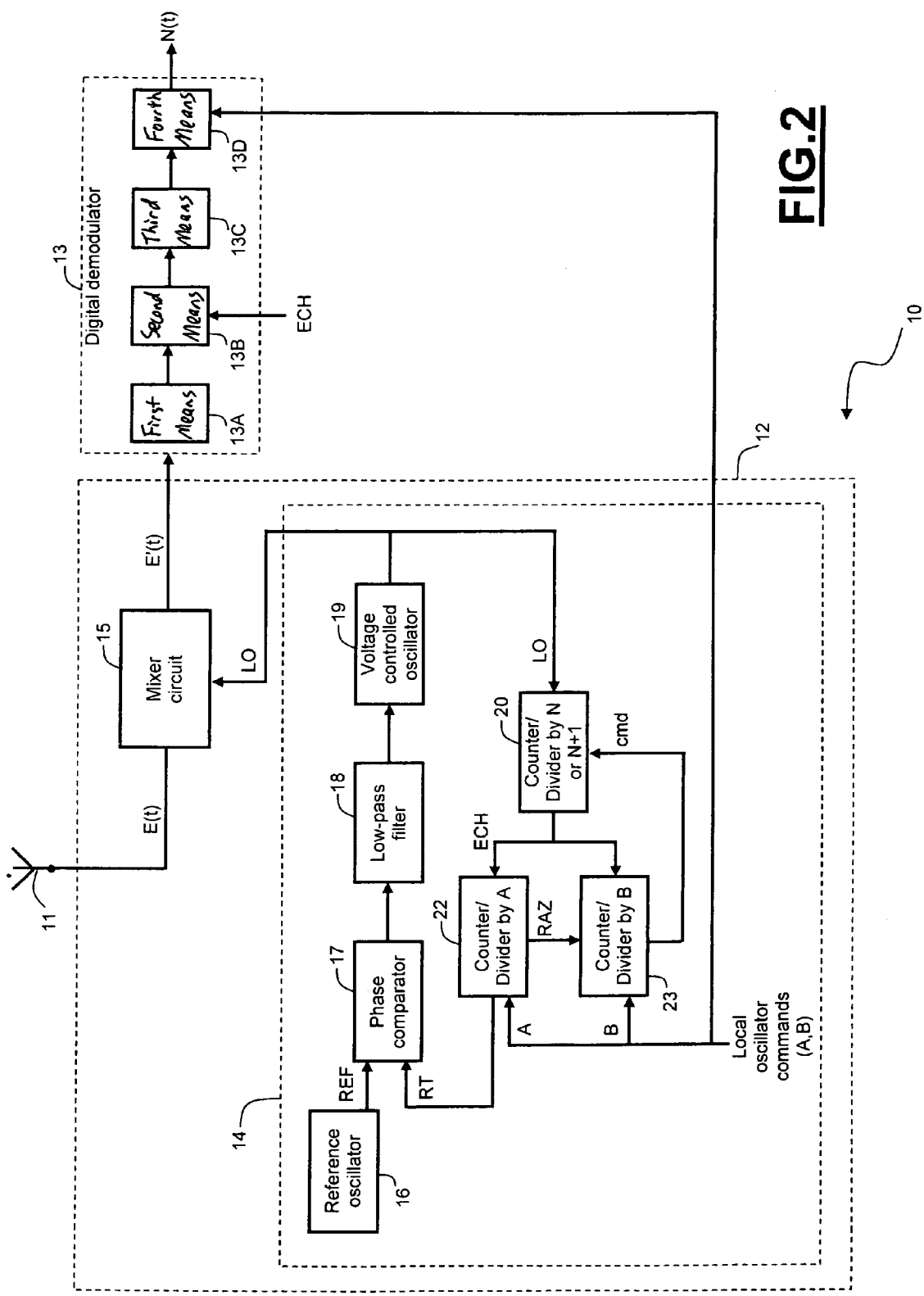
FIG. 2 is a more detailed block diagram of a receiver in the case of frequency demodulation with frequency hopping.

In the case of demodulation by frequency shift keying with frequency hopping, the frequency of the signal is changed periodically and randomly. This case is illustrated in FIG. 2. Control values A and B are designed to make periodic changes in the frequency of the signal LO. In this figure, the frequency divider 20 is a counter/divider designed to divide the frequency of the signal LO either by N or by N+1, with N being an integer. This counter/divider delivers the sampling signal ECH. The frequency divider 21 is formed by two counter/divider units 22 and 23. These counter/divider units are pre-settable counters whose limit counting value can be modified. The counter/divider 22 is designed to count up to A and the counter/divider 23 is designed to count up to B, with A>B.

The counter/divider 20 is arranged with the other counters 22 and 23 so as to divide the frequency of the signal by N+1 so long as the counter 23 has not reached the value B and then divide the frequency of the signal LO by N, until the counter 22 reaches the value A.

The counter/divider 20 comprises a control input to receive a control signal cmd from the counter 23. So long as the counter 23 has not reached the value B, the signal cmd has a first logic state; the divider circuit 20 then divides the signal LO by N+1. The counters 22 and 23 are responsible for counting the pulses of the signal ECH delivered by the divider circuit 20. When the counter 23 reaches the value B, the control signal cmd changes its logic state and the divider circuit 20 then divides the signal LO by N. The counter 22 continues counting until it reaches the value A; it then resets the counter 23 by the signal RAZ. The signal RT is the signal delivered by the counter 22.

In this case of demodulation with frequency hopping, the instantaneous frequency of the sampling signal ECH is equal at times to $f_{LO}/N$, and at other times to $f_{LO}/N+1$. However, the mean value of the frequency of the sampling signal is known. It is equal to the following.

$$F_{ECH}=A.f_{RT}=A.f_{LO}/[(A-B).N+B.(N+1)]=A.f_{LO}/(A.N+B)$$

The difference between the instantaneous value and the mean value of the frequency of the sampling signal may be considered to be noise and is not a source of problems when the following conditions are fulfilled.

$$|f1-f2|>>(f_{LO}/N)-(f_{LO}/(N+1))$$

$$|f1|>>f_{LO}/N$$

In this context of frequency demodulation with frequency hopping, the control values A and B are also supplied to the comparison means 13D of the digital modulator 13 so that the period values representing digital values take account of the periodic changes in the values A and B.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A receiver of a frequency-modulated signal representing a digital signal, the receiver comprising:
    a frequency-transposition unit for lowering the frequency of the frequency-modulated signal so as to produce a frequency-transposed signal; and
    a digital demodulator for regenerating the digital signal from the frequency-transposed signal, the frequency-transposed signal being sampled in the digital demodulator at the rate of a sampling signal, wherein the frequency-transposition unit includes a phase-locked loop for generating a first signal used in lowering the frequency of the frequency-modulated signal, and the sampling signal is generated by the phase-locked loop of the frequency-transposition unit.

2. The receiver according to claim 1, wherein the frequency-transposition unit further comprises a reference oscillator that is coupled to the phase-locked loop, and the phase-locked loop has a feedback portion that includes first and second cascade-connected frequency-divider circuits.

3. The receiver according to claim 2, wherein the sampling signal is delivered by the first frequency-divider circuit.

4. The receiver according to claim 1, wherein the phase-locked loop includes at least one frequency-divider circuit.

5. The receiver according to claim 4, wherein the sampling signal is delivered by the frequency-divider circuit.

6. An integrated circuit including a receiver of a frequency-modulated signal representing a digital signal, the receiver comprising:

a frequency-transposition unit for lowering the frequency of the frequency-modulated signal so as to produce a frequency-transposed signal; and a digital demodulator for regenerating the digital signal from the frequency-transposed signal, the frequency-transposed signal being sampled in the digital demodulator at the rate of a sampling signal, wherein the frequency-transposition unit includes a phase-locked loop for generating a first signal used in lowering the frequency of the frequency-modulated signal, and the sampling signal is generated by the phase-locked loop of the frequency-transposition unit.

7. The integrated circuit according to claim 6, wherein the frequency-transposition unit further comprises a reference oscillator that is coupled to the phase-locked loop, and the phase-locked loop has a feedback portion that includes first and second cascade-connected frequency-divider circuits.

8. The integrated circuit according to claim 7, wherein the sampling signal is delivered by the first frequency-divider circuit.

9. The integrated circuit according to claim 6, wherein the phase-locked loop includes at least one frequency-divider circuit that delivers the sampling signal.

10. An information processing system including at least one receiver of a frequency-modulated signal that represents a digital signal, the receiver comprising:

a frequency-transposition unit for lowering the frequency of the frequency-modulated signal so as to produce a frequency-transposed signal; and a digital demodulator for regenerating the digital signal from the frequency-transposed signal, the frequency-transposed signal being sampled in the digital demodulator at the rate of a sampling signal, wherein the frequency-transposition unit includes a phase-locked loop for generating a first signal used in lowering the frequency of the frequency-modulated signal, and the sampling signal is generated by the phase-locked loop of the frequency-transposition unit.

11. The information processing system according to claim 10, wherein the frequency-transposition unit further comprises a reference oscillator that is coupled to the phase-locked loop, and the phase-locked loop has a feedback portion that includes first and second cascade-connected frequency-divider circuits.

12. The information processing system according to claim 11, wherein the sampling signal is delivered by the first frequency-divider circuit.

13. The information processing system according to claim 10, wherein the phase-locked loop includes at least one frequency-divider circuit that delivers the sampling signal.

14. A method for regenerating a digital signal from a frequency-modulated signal that represents the digital signal, said method comprising the steps of:

using a phase-locked loop of a frequency-transposition unit to generate a first signal;

using the first signal generated by the phase-locked loop of the frequency-transposition unit to lower the frequency of the frequency-modulated signal so as to produce a frequency-transposed signal;

using the phase-locked loop of the frequency-transposition unit to generate a sampling signal from the first signal generated by the phase-locked loop of the frequency-transposition unit;

sampling the frequency-transposed signal at the rate of the sampling signal; and regenerating the digital signal from the frequency-transposed signal.

15. The method according to claim 14, wherein the step of using the phase-locked loop of the frequency-transposition unit to generate the sampling signal includes the substep of using a frequency divider of the phase-locked loop for frequency-dividing the first signal to produce the sampling signal.

16. The method according to claim 14, wherein the step of using the phase-locked loop of the frequency-transposition unit to generate the first signal comprises:

generating a reference signal; and using the phase-locked loop to produce the first signal from the reference signal.

17. The method according to claim 16, wherein the step of using the phase-locked loop of the frequency-transposition unit to generate the sampling signal includes the substep of using a frequency divider of the phase-locked loop for frequency-dividing the first signal to produce the sampling signal.

18. The receiver according to claim 1, wherein the phase-locked loop includes a voltage-controlled oscillator, a first frequency-divider circuit having an input coupled to an output of the voltage-controlled oscillator, and a second frequency-divider circuit having an input coupled to the output of the first frequency-divider circuit, and the sampling signal is provided by the output of the first frequency-divider circuit.

19. The receiver according to claim 18, wherein the first signal is provided by the output of the voltage-controlled oscillator.

20. The receiver according to claim 1, wherein the frequency-transposition unit further comprises a reference oscillator having an output that is connected to an input of the phase-locked loop, and the output of the reference oscillator does not provide the sampling signal.

* * * * *